United States Patent [19]
Okazaki

[11] Patent Number: 5,649,237
[45] Date of Patent: Jul. 15, 1997

[54] IMAGE MOVEMENT CORRECTION OF CAMERA

[75] Inventor: Mitsuhiro Okazaki, Kawasaki, Japan

[73] Assignee: Nikon Corporation, Tokyo, Japan

[21] Appl. No.: 355,475

[22] Filed: Dec. 14, 1994

[30] Foreign Application Priority Data

Dec. 14, 1993 [JP] Japan .................... 5-342631
Dec. 12, 1994 [JP] Japan .................... 6-307684

[51] Int. Cl.$^6$ ................................. G03B 17/00
[52] U.S. Cl. ..................... 396/55; 348/208; 396/52
[58] Field of Search .................... 354/430, 400, 354/475, 195.1; 348/208; 396/52-55

[56] References Cited

U.S. PATENT DOCUMENTS

| | | | |
|---|---|---|---|
| 5,155,520 | 10/1992 | Nagasaki et al. | 354/430 |
| 5,307,170 | 4/1994 | Itsumi et al. | 348/219 |
| 5,335,032 | 8/1994 | Onuki et al. | 354/195.1 |
| 5,444,512 | 8/1995 | Morizumi | 354/430 |
| 5,460,341 | 10/1995 | Katsuyama et al. | 244/118.1 |

FOREIGN PATENT DOCUMENTS

| | | |
|---|---|---|
| 2-309702 | 12/1990 | Japan . |
| 3-046642 | of 1991 | Japan . |
| 3-37616 | 2/1991 | Japan . |
| 4-328531 | of 1992 | Japan . |
| 5-158100 | 3/1993 | Japan . |

*Primary Examiner*—Safet Metjahic
*Assistant Examiner*—Eric Nelson

[57] ABSTRACT

In an image correcting camera capable of correcting movement of an image properly by detecting translational movements thereof, there are provided acceleration detectors for detecting respective accelerations in directions of three axes acting on the camera, angular rate detectors for detecting respective angular rates around the three axes acting on the camera, an attitude determining device for calculating a coordinate transformation matrix between a camera coordinate system and a static coordinate system from the accelerations in the three axial directions and the angular rates around the three axes, and a gravitation acceleration component calculating device for calculating gravitational acceleration components in the camera coordinate system by the use of the coordinate transformation matrix. Displacements of translational movements are calculated by eliminating the gravitational acceleration components from the outputs of the acceleration detectors and a correction drive amount calculating device calculates an amount of movement of the image based on the displacements.

10 Claims, 6 Drawing Sheets

IMAGE MOVEMENT CORRECTION OF CAMERA

BACKGROUND OF THE INVENTION

1. Field of the Invention

The present invention relates to an image correcting camera capable of correcting movement of an image due to movement of hands at the time of photographing.

2. Related Background Art

There are known image correcting cameras which have an image correcting device for correcting movement of an image due to movement of hands at the time of photographing. When a vibration sensor provided in such a camera detects vibrations, the image movement correcting device drives a correcting lens provided in a portion of the photographing lens system to cancel the vibrations thereby to correct movement of an image based on the output of the vibration sensor while the shutter is opened.

Figure 7:
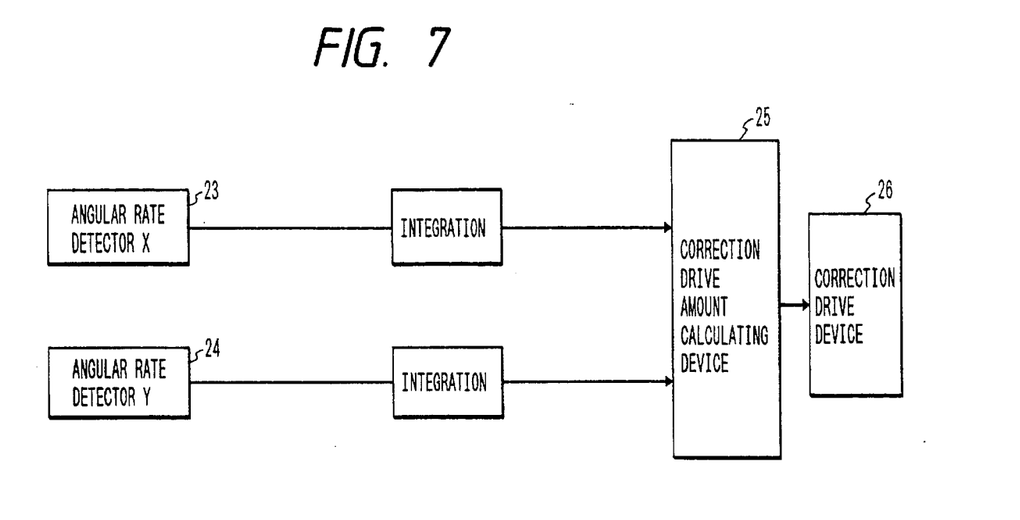
FIG. 7 is a block diagram showing the structure of a conventional image correcting camera.
Figure 8:
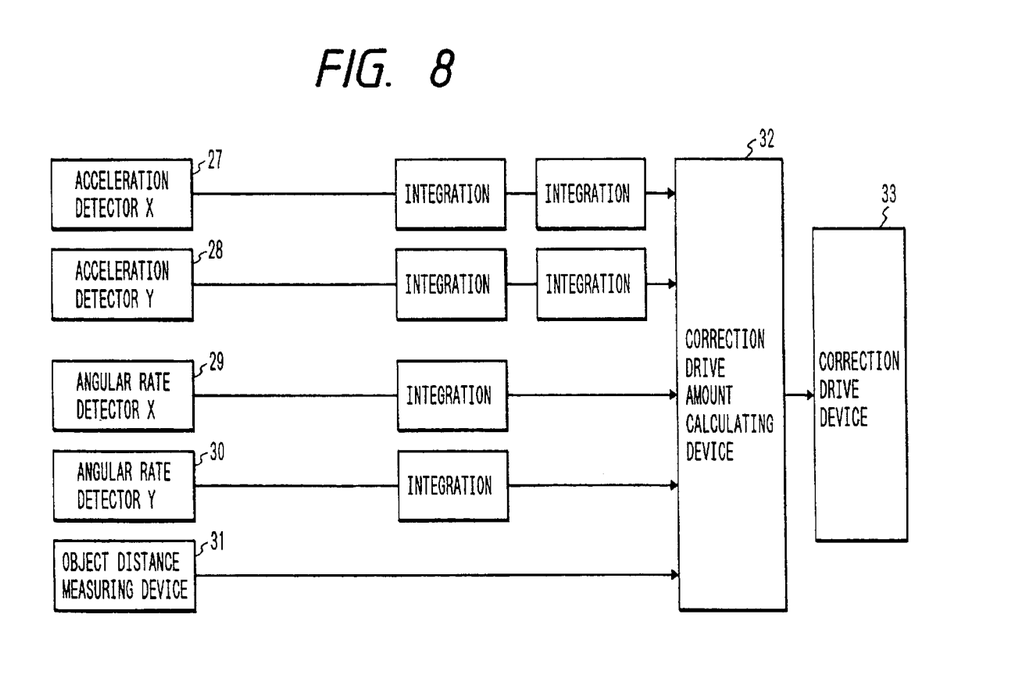
FIG. 8 is a block diagram showing the structure of another conventional image correcting camera.

FIGS. 7 and 8 are block diagrams showing structures of conventional image correcting cameras capable of correcting movement of an image as disclosed in Japanese Patent Application Laid-Open Nos. 3-37616 and 3-46642 respectively.

The camera in FIG. 7 is provided with angular rate detectors 23, 24, a correction drive amount calculating device 25 and a correction drive device 26.

The angular rate detectors 23, 24 detect angular rates (movements) around X- and Y-axes which are at right angles to the optical axis of the camera.

Based on the displacements (rotation angles) around the X- and Y-axis directions calculated from respective outputs of the angular rate detectors 23, 24, the correction drive amount calculating device 25 calculates an amount of drive of a correcting lens (not shown) so as to cancel the movement of the image.

The correction drive device 26 correct the movement of the image occurring in the camera by driving the correcting lens in accordance with the calculated amount of drive.

The camera in FIG. 8 is provided with acceleration detectors 27, 28, angular rate detectors 29, 30, an object distance measuring device 31, correction drive amount calculating device 32 and a correction drive device 33.

The acceleration detectors 27, 28 detect accelerations in X- and Y-axis directions respectively.

The angular rate detectors 29, 30 detect angular rates around X- and Y-axes respectively.

The object distance measuring device 31 measures the distance between an object and the camera.

Based on a displacement (an amount of movement) in the Y-axis direction calculated from the output of the acceleration detector 28, a displacement (a rotation angle) around the X-axis calculated from the output of the angular rate detector 29, and the output of the object distance measuring device 31, the correction drive amount calculating device 32 calculates an amount of rotation around the X-axis so as to cancel its movement. Similarly, based on a displacement in the X-axis direction calculated from the output of the acceleration detector 27, a displacement around the Y-axis calculated from the output of the angular rate detector 30, and the output of the object distance measuring device 31, the correction drive amount measuring device 32 calculates an amount of rotation around the Y-axis so as to cancel its movement.

In accordance with these calculated amounts, the correction drive device 33 rotates the optical system of the photographing device around the X- and Y-axes to correct the movement of the image in the X- and Y-axis directions.

However, in the above-mentioned cameras, there have been following problems.

In the camera of FIG. 7, since the movements of the camera are detected only by the angular rate detectors 23, 24, movements in translational directions cannot be detected. Therefore, it is impossible to correct the movement of the image produced by the movements in the translational directions. Particularly, when the photographing magnification is high, the movement of the image in translational directions of the camera are large, which causes the image quality to be lowered.

Also, in the camera of FIG. 8, movements in the translational directions of the camera can be detected by the acceleration detectors 27, 28, but since gravitational acceleration components acting on the acceleration detectors 27, 28 due to rotational movements of the camera are changed, the movements in the translational directions cannot be detected properly. Therefore, it is impossible to correct the movement of the image accurately, whereby a clear image cannot be obtained.

SUMMARY OF THE INVENTION

It is an object of the present invention to provide an image correcting camera capable of detecting its translational movements accurately and correcting movement of an image properly to obtain the image clearly.

In order to achieve the above and other objects, an image correcting camera according to a first embodiment of the present invention has an acceleration detecting device for detecting respective accelerations in three directions of X-, Y- and Z-axes acting on the camera; an angular rate detecting device for detecting respective angular rates around the three axes acting on the camera; an attitude determining device for calculating a coordinate transformation matrix between a camera coordinate system and a static coordinate system from an initial position of the camera with respect to the static coordinate system and the angular rates around the three axes; a gravitational acceleration component calculating device for calculating gravitational acceleration components in the camera coordinate system by the use of the coordinate transformation matrix; an object distance measuring device for measuring the distance between the camera and an object; a photographing magnification detector for detecting a photographing magnification of the camera; a correction drive amount calculating device for calculating an amount of movement of an image based on respective displacements in the X- and Y-axis directions or the three axial directions calculated by eliminating the gravitational acceleration components from the respective accelerations in the X- and Y-axis directions or the three axial directions, respective rotation angles around the X- and Y-axes or the three axes calculated from the respective angular rates around the X- and Y-axes or the three axes, the distance between the camera and the object, and the photographing magnification, and calculating an amount of drive of a correcting lens and/or an image pick-up surface so as to cancel the amount of movement of the image; and a correction drive device for driving the correcting lens and/or the image pick-up surface.

The attitude determining device calculates the initial attitude of the camera with respect to the static coordinate system from a gravitational acceleration direction in the camera coordinate system obtained from the accelerations in the three axial directions.

An image correcting camera according to another embodiment of the present invention has an angular rate detecting device for detecting respective angular rates around X-, Y- and Z-axes acting on the camera; an acceleration detecting device for detecting respective accelerations in the X- and Y-axis directions acting on the camera; an attitude detector for detecting an initial attitude of the camera by detecting a gravitational acceleration direction; an attitude determining device for calculating a coordinate transformation matrix between a camera coordinate system and a static coordinate system from the initial attitude of the camera and the angular rates around the three axes; a gravitational acceleration component calculating device for calculating gravitational acceleration components in the camera coordinate system by the use of the coordinate transformation matrix; an object distance measuring device for measuring the distance between the camera and an object; a photographing magnification detector for detecting a photographing magnification of the camera; a correction drive amount calculating device for calculating an amount of movement of an image based on respective displacements in the X- and Y-axis directions calculated by eliminating the gravitational acceleration components from the respective accelerations in the X- and Y-axis directions, respective rotation angles around the X- and Y-axes calculated from the respective angular rates around the X- and Y-axes, the distance between the camera and the object, and the photographing magnification, and calculating an amount of drive of a correcting lens and/or an image pick-up surface so as to cancel the amount of movement of the image; and a correction drive device for driving the correcting lens and/or the image pick-up surface.

According to the above embodiments, the coordinate transformation matrix between the camera coordinate system and the static coordinate system is calculated by means of the attitude determining device from the outputs of the acceleration detecting device, the attitude detecting device and the angular rate detecting device. Then, the gravitational acceleration components in the camera coordinate system is calculated by means of the gravitational acceleration component calculating device. When the gravitational acceleration components are eliminated from the outputs of the acceleration detecting device, only the accelerations generated in the translational movements are calculated. Therefore, even though the gravitational acceleration components acting on the acceleration detecting device due to rotational movements is changed, the displacements due to the translational movements can be calculated accurately.

DETAILED DESCRIPTION OF THE PREFERRED EMBODIMENTS

Preferred embodiments of the present invention will be described with reference to the accompanying drawings.

Figure 9:
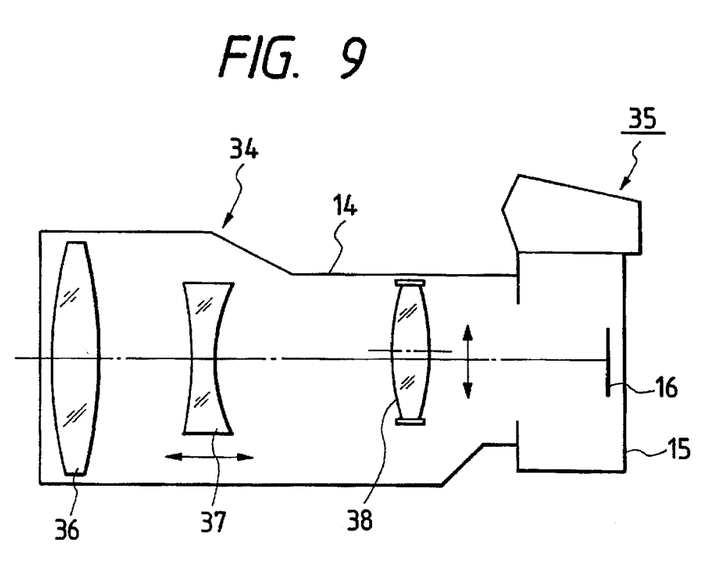
FIG. 9 is a schematic diagram showing a correction optical device of the image correcting camera of the present invention.

FIG. 9 schematically shows a correction optical device of an image correcting camera 35 capable of correcting movement of an image. The correction optical device includes a fixed lens 36, a focusing lens 37, an image movement correcting lens 38 and a film surface 16.

Figure 1:
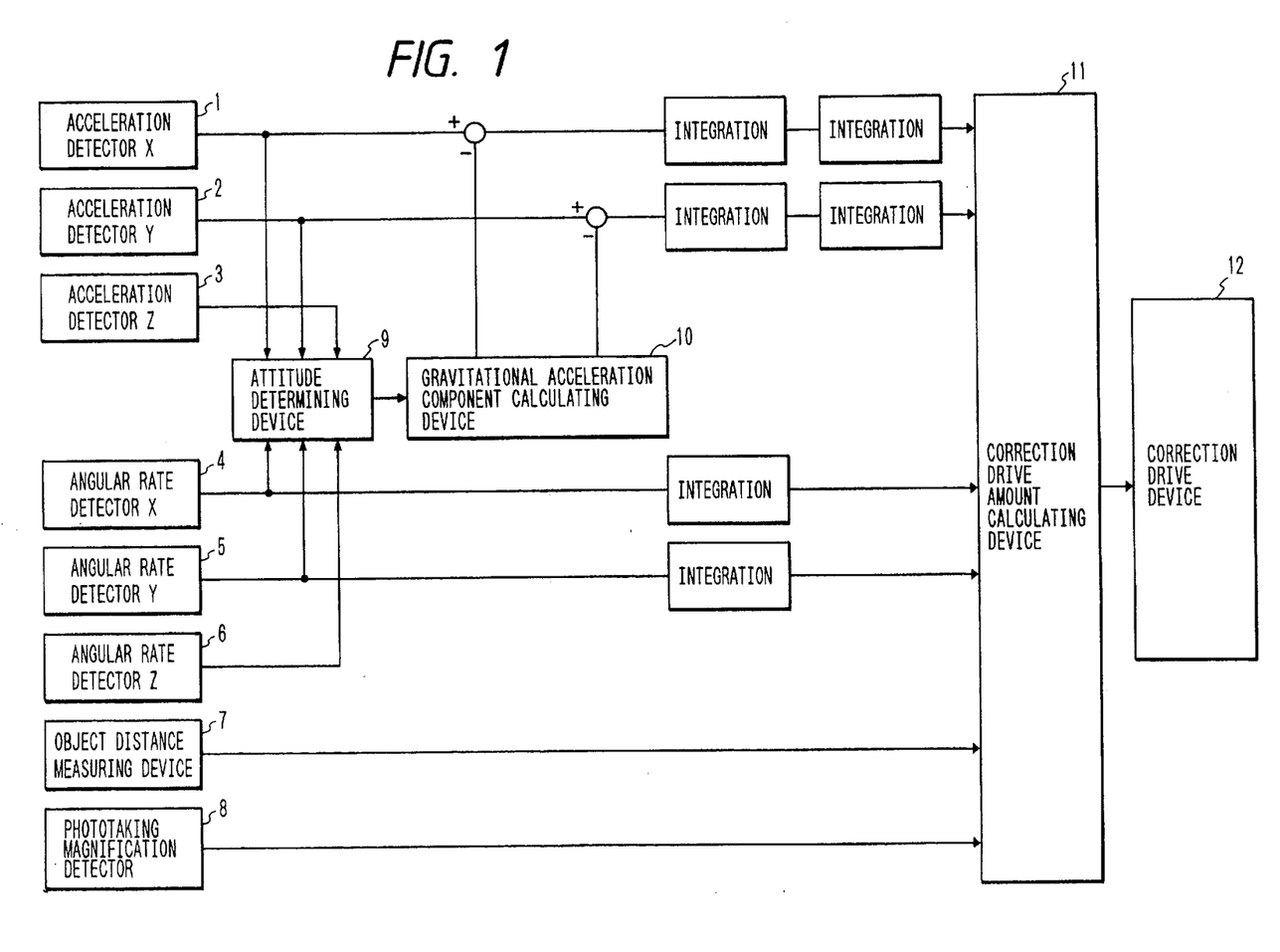
FIG. 1 is a block diagram showing the structure of an image correcting camera according to a first preferred embodiment of the present invention.
Figure 2A:
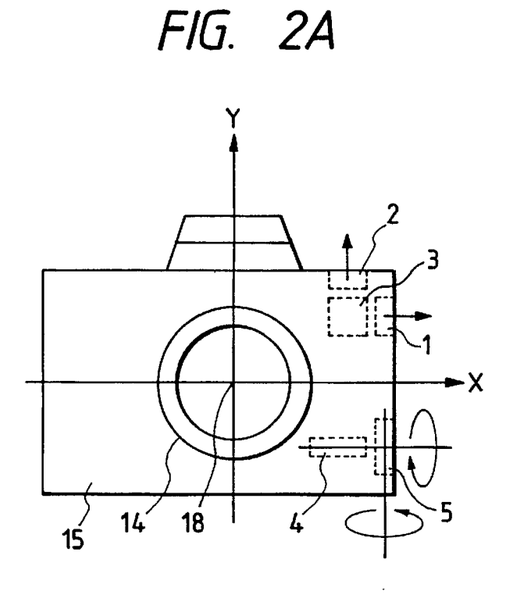
FIGS. 2A and 2B each show an example of the positions of acceleration detectors 1, 2, 3 and angular rate detectors 4, 5, 6 in the camera.
Figure 2B:
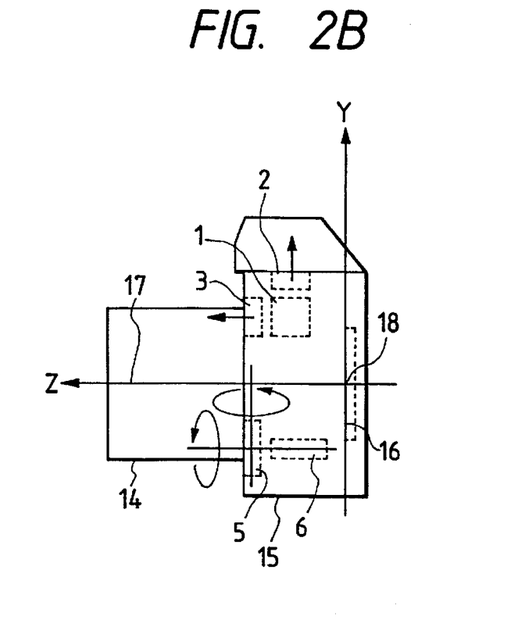

FIG. 1 shows a block diagram showing an image correcting camera according to a first preferred embodiment of the present invention. This image correcting camera has acceleration detectors 1, 2, 3 and angular rate detectors 4, 5, 6. FIGS. 2A and 2B show examples of the positions of the acceleration detectors 1, 2, 3 and the angular rate detectors 4, 5, 6 in the camera. The acceleration detectors 1, 2, 3 and the angular rate detectors 4, 5, 6 are mounted in a main body 15 of the camera to detect accelerations in directions of three axes and the angular rates around the three axes respectively.

In this embodiment, an intersection of the film surface 16 and an optical axis 17 of a camera lens 14 is made an origin 18, the optical axis 17 of the camera lens 14 represents a Z-axis, and the film surface 16 represents an XY-plane.

Output values of the acceleration detectors 1, 2, 3 include accelerations generated in translational movements and gravitational accelerations. Also, since the attitude of the camera is changed due to a rotational movement of the camera, angles formed by directions of detection axes of the acceleration detectors 1, 2, 3 fixed to a camera coordinate system and the gravitational acceleration direction are changed. Therefore, the magnitudes of the gravitational accelerations included in the output values of the acceleration detectors 1, 2, 3 are changed. Accordingly, the gravitational acceleration components are eliminated from the output values of the acceleration detectors 1, 2, 3 and the displacements are calculated only by the acceleration components generated in the translational movements.

In order to calculate the gravitational acceleration components, an attitude determining device 9 and gravitational acceleration component calculating device 10 are provided in the image correcting camera.

Figure 3:
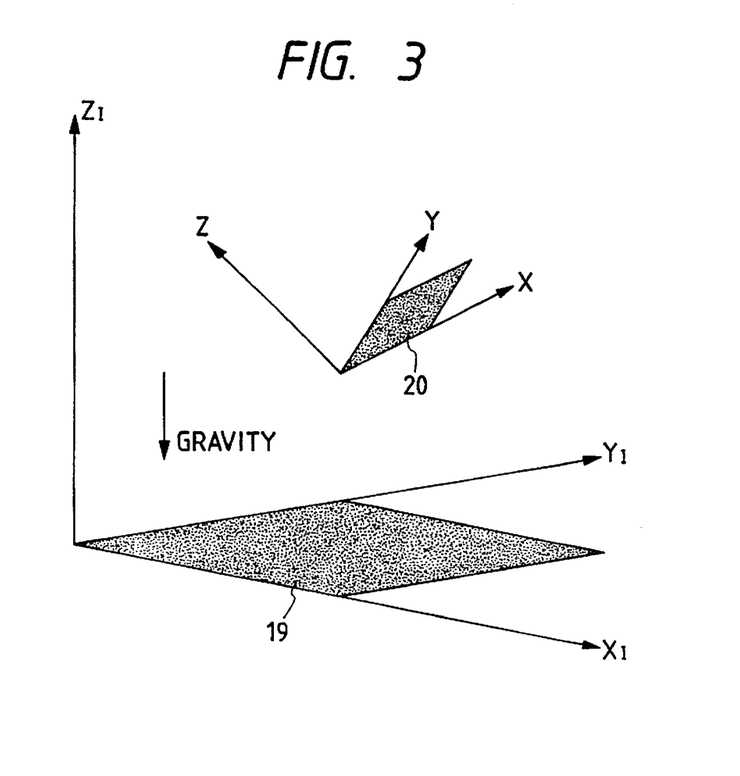
FIG. 3 shows an inertial coordinate system 19 as a static coordinate system and a camera coordinate system 20 as a moving coordinate system.

The attitude determining device 9 calculates a coordinate transformation matrix T for transforming an inertial coordinate system 19 as a static coordinate system into a camera coordinate system 20 as a moving coordinate system, as shown in FIG. 3. The coordinate transformation matrix T is calculated from the initial attitude of the camera, the accelerations around the three axes obtained from the outputs of the angular rate detectors 4, 5, 6. This calculating method is the same as a method used in a strap-down type inertial navigation system and the detailed description thereof is disclosed in, e.g., Japanese Patent Application Laid-Open No. 2-309702.

First, the initial attitude of the camera is obtained by the use of a gravitational acceleration direction obtained from the outputs of the acceleration detectors 1, 2, 3. Since there are rotational movements and translational movements in the camera, the gravitational acceleration direction is measured for a proper period of time and the average of the measurement results is calculated to obtain an average gravitational acceleration direction. Then, from the gravitational acceleration direction in the camera coordinate system, an average attitude of the camera with respect to the inertial coordinate system is obtained to set it as the initial attitude of the camera.

The following equation 1 is a differential equation for calculating the coordinate transformation matrix T. The coordinate transformation matrix T is calculated by obtaining $\Omega_c$ by substituting angular rates $\omega_x$, $\omega_y$, $\omega_z$ around the X-, Y- and Z-axes being the outputs of the angular rate detectors 4, 5, 6 into the equation 1 and solving the differential equation with the initial attitude of the camera as an initial condition.

$$\dot{T} = \Omega_c \cdot T \qquad \text{Equation 1}$$

$$\Omega_c = \begin{bmatrix} 0 & \omega_Z & -\omega_Y \\ -\omega_Z & 0 & \omega_X \\ \omega_Y & -\omega_X & 0 \end{bmatrix}$$

The gravitational acceleration component calculating means 10 multiplies each gravitational acceleration component of the inertial coordinate system by the coordinate transformation matrix to obtain gravitational acceleration components in the camera coordinate system. When the respective gravitational acceleration components are removed from the accelerations in the X- and Y-axis directions (i.e., from the output values of the acceleration detectors 1, 2, accelerations generated in the translational movements can be obtained. The obtained accelerations are integrated to calculate the displacements of the translational movements in the X- and Y-axis directions. On the other hand, the angular rates around the X- and Y-axes (i.e., the output values of the angular rate detectors 4, 5) are integrated to calculate rotation angles around the X- and Y-axes.

An object distance measuring device 7 measures the distance between the object and the camera from an amount of shift of the focusing lens at the time of focusing by the use of a lens provided with an encoder.

A photographing magnification detector 8 detects the magnification of the camera at the time of photographing.

Figure 4A:
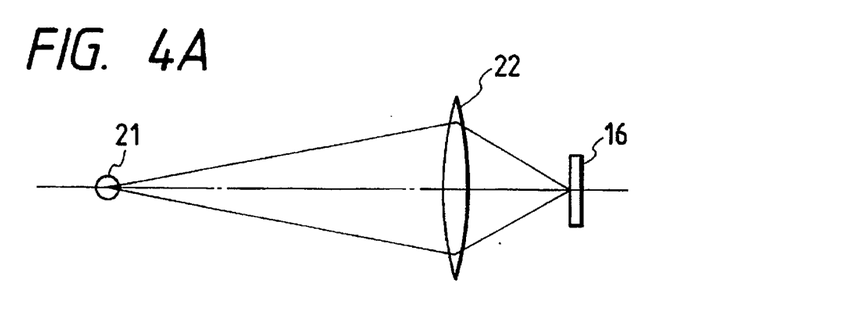
FIGS. 4A and 4B each show movement of an image on a film surface 16.
Figure 4B:
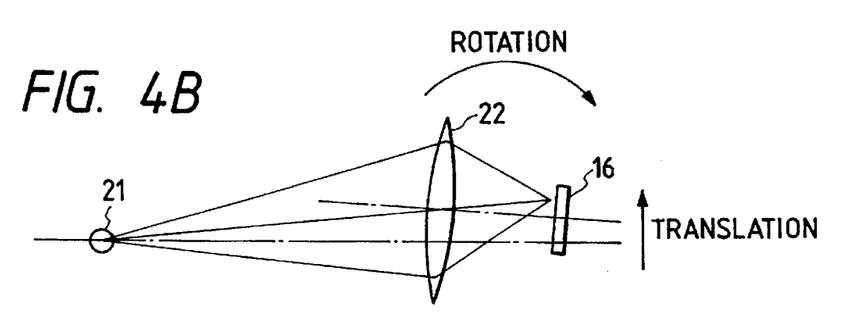

Correction drive amount calculating device 11 calculates an amount of drive of the correcting lens 38 for correcting movement of an image. The correction drive amount calculating device 11 obtains a movement of the camera affecting the movement of the image in accordance with the displacements of the translational movements in the X- and Y-axis directions and the rotation angles around the X- and Y-axes calculated as above. Further, in FIGS. 4A and 4B showing an object 21, a lens 22 and the film surface 16, an amount of two-dimensional movement of the image on the film surface 16 is obtained from the distance between the object 21 and the camera and the photographing magnification. Next, by the use of these signals, a signal for driving the correcting lens 38 to cancel the movement of the image is calculated.

A correction drive device 12 drives the correcting lens 38 in accordance with this signal. As the correction drive device 12, there is a known correction drive device as disclosed in, e.g., Japanese Patent Application Laid-Open No. 5-158100.

As above, the correcting lens 38 is driven by the signals obtained by eliminating the gravitational acceleration components from the output values of the acceleration detectors 1, 2, so that the movement of the image can be corrected with no influence of the gravitational acceleration components, making it possible to obtain a clear image.

Figure 5:
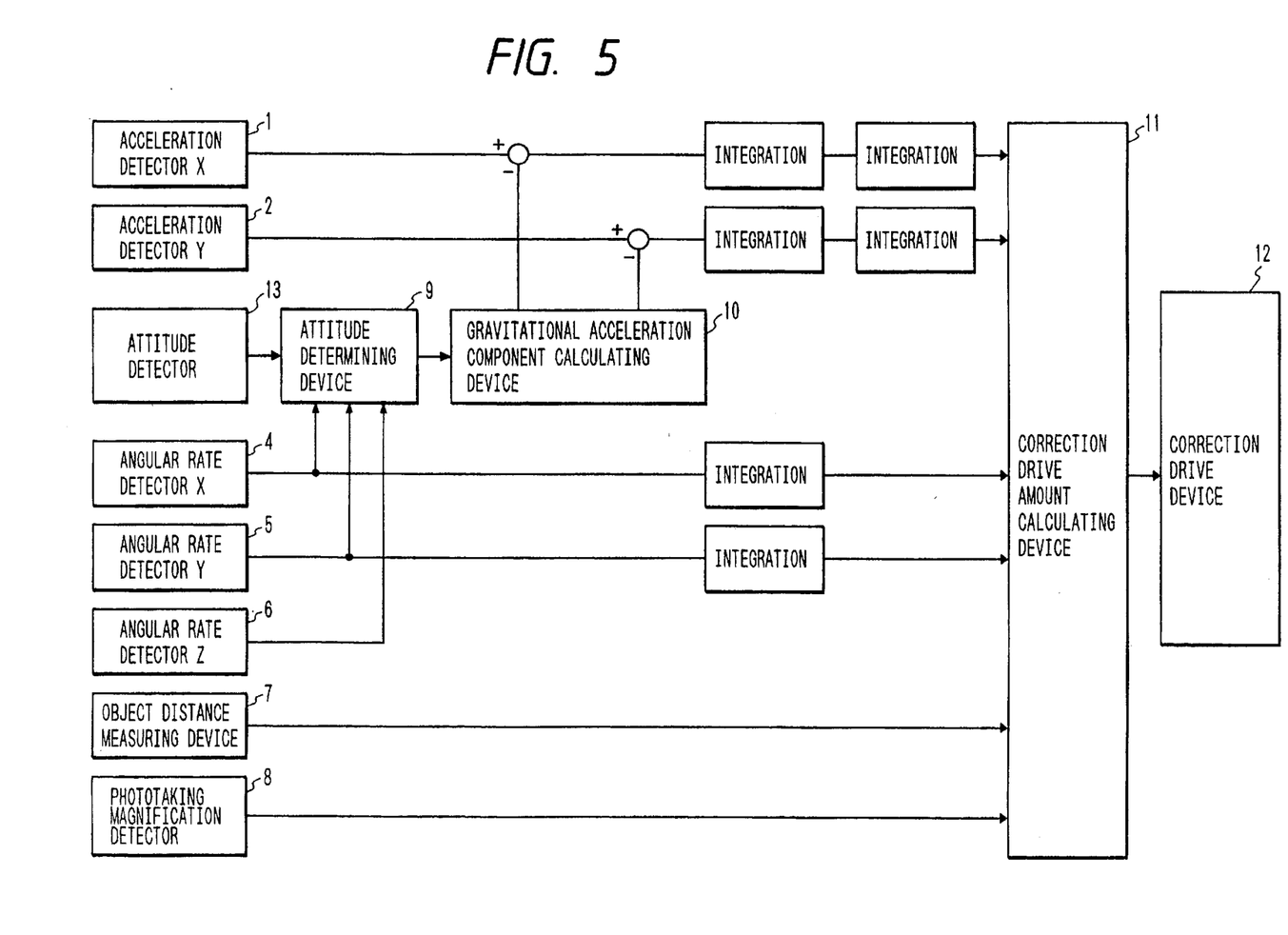
FIG. 5 is a block diagram showing the structure of an image correcting camera according to a second preferred embodiment of the present invention.
Figure 6:
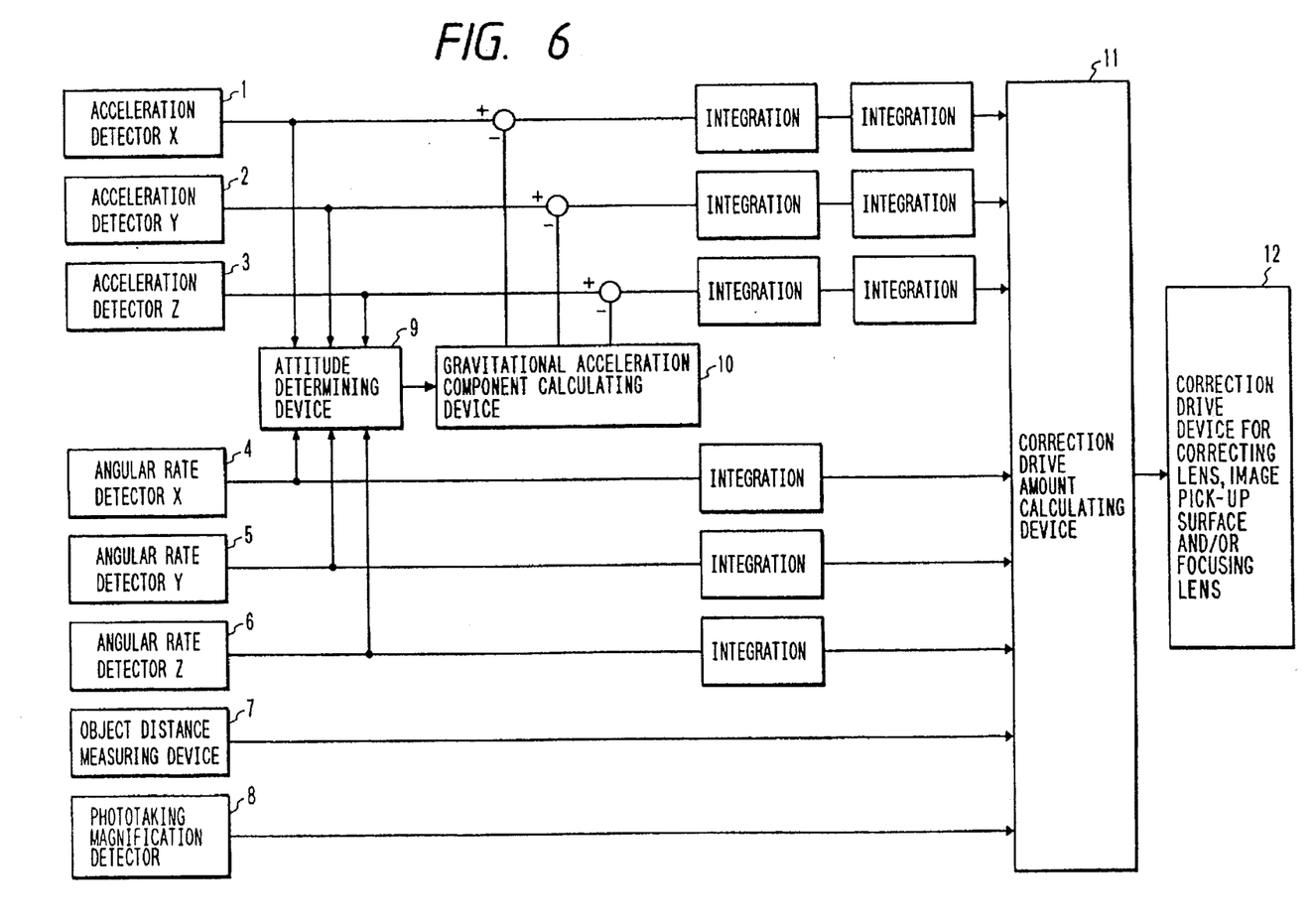
FIG. 6 is a block diagram showing the structure of an image correcting camera according to a third preferred embodiment of the present invention.

FIGS. 5 and 6 show the structures of image correcting cameras according to second and third preferred embodiments of the present invention respectively. Respective elements identical to those in FIG. 1 are designated by the identical reference numerals and the structures different from those in the first embodiment will be described.

In the camera in FIG. 5, an attitude detector 13 is provided instead of the acceleration detector 3. The attitude detector 13 detects the gravitational acceleration direction to detect the attitude of the camera. Therefore, the attitude determining device 9 calculates the coordinate transformation matrix T by the use of the outputs from the attitude detector 13 and the angular rate detectors 4, 5, 6.

If the acceleration detectors 1, 2, 3 are a piezoelectric type which cannot detect static acceleration, the gravitational acceleration direction cannot be detected by the acceleration detectors 1, 2, 3, so that it is necessary to utilize the attitude detector 13 in FIG. 5. In this case, it is not necessary to provide the acceleration detector 3 for detecting the acceleration in the Z-axis direction.

Also, in the camera of FIG. 1, the amount of two-dimensional movement of the image on the film surface 16 is obtained and corrected from the displacements of the translational movements in the X- and Y-directions and the rotation angles around the X- and Y-axes. However, in the camera of FIG. 6, the displacement of the translational movement in the Z-axis direction and the rotation angle around the Z-axis are included further to obtain and correct an amount of three-dimensional movement of the image.

Therefore, gravitational acceleration components calculated by the gravitational acceleration component calculating means 10 are eliminated from the acceleration in the Z-axis direction being the output value of the acceleration detector 3 and the obtained value is integrated to calculate the displacement of the translational movement in the Z-axis direction. The calculated displacement is sent to the correction drive amount calculating device 11.

Also, the angular rate around the Z-axis being the output value of the angular rate detector 6 is integrated to calculate a rotation angle around the Z-axis. The calculated rotation angle is sent to the correction drive amount calculating device 11.

At this time, in order to correct a focal shift due to the displacement of the translational movement in the Z-axis direction, for example, a focusing lens to be used in automatic focusing may be driven. Also, in order to correct the movement of the image due to the rotational movement around the Z-axis, for example, an image pick-up surface may be rotated or an image rotator may be utilized.

Although the embodiments of the present invention have been described above, the present invention is not limited to the above embodiments and it will be understood that various changes and modifications may be made without departing from the scope of the invention.

For example, the acceleration detectors 1, 2, 3 and the angular rate detectors 4, 5, 6 are mounted inside the main body 15, but may be mounted in the camera lens 14. Also, instead of the acceleration detectors 1, 2, 3, a three-dimensional acceleration detector may be utilized to detect the accelerations in the three axial directions.

In the above embodiments, the movement of the image is corrected by driving the correcting lens, but may be corrected by driving the film. Also, in the case of a video camera, a correcting lens or an image pick-up device may be driven.

Also, although in the camera of FIG. 1, or FIG. 6, the attitude determining device 9 obtains the initial attitude of the camera by the use of the gravitational acceleration direction in the camera coordinate system obtained from the outputs of the acceleration detectors 1, 2, 3, the initial attitude of the camera may be obtained in another way. For example, the camera is first disposed in a certain attitude (a horizontal attitude, a vertical attitude, etc.) and is made to recognize this attitude as the initial attitude of the camera by depressing a button or the like.

According to the cameras of the present invention, the movement of the image is corrected by calculating the displacements of the translational movements excluding gravitational acceleration components. Therefore, even though the gravitational acceleration components acting on the acceleration detectors are changed due to rotational movements, the movement of the image can be corrected properly, making it possible to attain a clear image.

What is claimed is:

1. An image correcting camera comprising:

an acceleration detecting device to detect accelerations in three directions of X-, Y- and Z-axes acting on said camera;

an angular rate detecting device to detect angular rates around said three axes acting on said camera;

an attitude determining device to calculate a coordinate transformation matrix between a camera coordinate system and a static coordinate system from an initial attitude of said camera with respect to said static coordinate system and said angular rates around said three axes;

a gravitational acceleration component calculating device to calculate gravitational acceleration components in said camera coordinate system by the use of said coordinate transformation matrix;

an object distance measuring device to measure the distance between said camera and an object;

a photographing magnification detector to detect a photographing magnification of said camera;

a correction drive amount calculating device to calculate an amount of movement of an image based on respective displacements in the X- and Y-axis directions or the three axial directions calculated by eliminating said gravitational acceleration components from said respective accelerations in the X- and Y-axis directions or the three axial directions, respective rotation angles around the X- and Y-axes or the three axes calculated from said respective angular rates around the X- and Y-axes or the three axes, the distance between said camera and said object, and said photographing magnification, and to calculate an amount of drive of a correcting lens and/or an image pick-up surface so as to cancel said amount of movement of said image; and a correction drive device to drive said correcting lens and/or said image pick-up surface.

2. An image correcting camera according to claim 1, wherein the acceleration detecting device includes plural acceleration detecting devices to detect respective accelerations in three directions of X-, Y- and Z-axis acting on said camera; and the angular rate detecting device includes plural angular detecting devices to detect respective angular rates around said three axes acting on said camera.

3. An image correcting camera according to claim 2, wherein said attitude determining device calculates said initial attitude of said camera with respect to said static coordinate system from a gravitational acceleration direction in said camera coordinate system obtained from said accelerations in the three axial directions.

4. An image correcting camera comprising:

angular rate detecting devices to detect respective angular rates around X-, Y- and Z-axes acting on said camera;

acceleration detecting devices to detect respective accelerations in said X- and Y-axis directions acting on said camera;

an attitude detector to detect an initial attitude of said camera by detecting a gravitational acceleration direction;

an attitude determining device to calculate a coordinate transformation matrix between a camera coordinate system and a static coordinate system from said initial attitude of said camera and said angular rates around said three axes;

a gravitational acceleration component calculating device to calculate gravitational acceleration components in said camera coordinate system by the use of said coordinate transformation matrix;

an object distance measuring device to measure the distance between said camera and an object;

a photographing magnification detector to detect a photographing magnification of said camera;

a correction device amount calculating device to calculate an amount of movement of an image based on respective displacements in the X- and Y-axis directions calculated by eliminating said gravitational acceleration components from said respective accelerations in the X- and Y-axis directions, respective rotation angles around the X- and Y-axes calculated from said respective angular rates around the X- and Y-axes, the distance between said camera and said object, and said photographing magnification, and to calculate an amount of drive of a correcting lens and/or an image pick-up surface so as to cancel said amount of movement of said image; and a correction drive device to drive said correcting lens and/or said image pick-up surface.

5. An image correcting camera comprising:

acceleration detecting devices to detect respective accelerations in three directions of X-, Y- and Z-axes acting on said camera;

angular rate detecting devices to detect respective angular rates around said three axes acting on said camera;

an attitude determining device to calculate a coordinate transformation matrix between a camera coordinate system and a static coordinate system from an initial attitude of said camera with respect to said static coordinate system and said angular rates around said three axes;

a gravitational acceleration component calculating device to calculate gravitational acceleration components in said camera coordinate system by the use of said coordinate transformation matrix;

an object distance measuring device to measure the distance between said camera and an object;

a photographing magnification detector to detect a photographing magnification of said camera;

a correction drive amount calculating device to calculate an amount of movement of an image and an amount of focal shift based on respective displacements in the three axial directions calculated by eliminating said gravitational acceleration components from said respective accelerations in the three axial directions, respective rotation angles around the three axes calculated from said respective angular rates around the three axes, the distance between said camera and said object, and said photographing magnification, to calculate an amount of drive of a correcting lens and/or an image pick-up surface so as to cancel said amount of movement of said image, and to calculate an amount of drive of a focusing lens and/or said image pick-up surface so as to cancel said amount of focal shift; and a correction drive device to drive said correcting lens and/or said focusing lens and/or said image pick-up surface.

6. An image correcting camera according to claim 5, wherein said attitude determining device calculates said initial attitude of said camera with respect to said static coordinate system from a gravitational acceleration direction in said camera coordinate system obtained from said accelerations in the three axial directions.

7. An image correcting camera comprising:

an acceleration detecting device to detect at least one acceleration acting on said camera;

an angular rate detecting device to detect at least one angular rate acting on said camera;

an attitude determining device to calculate a coordinate transformation matrix between a camera coordinate system and a static coordinate system from said angular rate;

a gravitational acceleration component calculating device to calculate gravitational acceleration components in said camera coordinate system by the use of said coordinate transformation matrix;

a correction drive amount calculating device to calculate an acceleration component by eliminating said gravitational acceleration components from said acceleration, and to calculate an amount of movement of an image and an amount of correction for said movement of said image based on a displacement calculated from said acceleration component and a rotation angle calculated from said angular rate; and an image movement correcting device to correct said movement of said image based on said amount of correction.

8. A method of correcting movement of an image in a camera, comprising:

the acceleration detecting step of detecting respective accelerations in three directions of X-, Y- and Z-axes acting on said camera;

the angular rate detecting step of detecting respective angular rates around said three axes acting on said camera;

the attitude determining step of calculating a coordinate transformation matrix between a camera coordinate system and a static coordinate system from an initial attitude of said camera with respect to said static coordinate system and said angular rates around said three axes;

the gravitational acceleration component calculating step of calculating gravitational acceleration components in said camera coordinate system by the use of said coordinate transformation matrix;

the correction drive amount calculating step of calculating an amount of movement of an image based on respective displacements in the X- and Y-axis directions or the three axial directions calculated by eliminating said gravitational acceleration components from said respective accelerations in the X- and Y-axis directions or the three axial directions, respective rotation angles around the X- and Y-axes or the three axes calculated from said respective angular rates around the X- and Y-axes or the three axes, the distance between said camera and an object, and a photographing magnification of said camera, and calculating an amount of drive of a correcting lens and/or an image pick-up surface so as to cancel said amount of movement of said image; and the correction drive step of driving said correcting lens and/or said image pick-up surface.

9. An image correcting camera comprising:

an attitude determining device to calculate a coordinate transformation matrix between a camera coordinate system and a static coordinate system from an initial attitude of said camera with respect to said static coordinate system and angular rates in three directions;

a gravitational acceleration component calculating device to calculate gravitational acceleration components in said camera coordinate system by the use of said coordinate transformation matrix;

a correction drive device to drive a correcting lens and/or an image pick-up surface, and/or a focusing lens based on a drive amount calculated from said angular rates, an object distance, a photographing magnification, and displacements in said three directions by eliminating said gravitational acceleration components from accelerations in said three directions.

10. A method of correcting camera movement comprising the steps of:

calculating a coordinate transformation matrix between a camera coordinate system and a static coordinate system from an initial attitude of said camera with respect to said static coordinate system and angular rates in three directions;

calculating gravitational acceleration components in said camera coordinate system by the use of said coordinate transformation matrix;

driving a correcting lens and/or an image pick-up surface, and/or a focusing lens based on a correction amount calculated from said angular rates, an object distance, a photographing magnification, and displacements in said three directions by eliminating said gravitational acceleration components from accelerations in said three directions.

* * * * *

UNITED STATES PATENT AND TRADEMARK OFFICE
CERTIFICATE OF CORRECTION

PATENT NO. : 5,649,237
DATED : July 15, 1997
INVENTOR(S) : Mitsuhiro OKAZAKI

It is certified that error appears in the above-identified patent and that said Letters Patent is hereby corrected as shown below:

Title Page,    Col. 2, line 1, "of 1991" s/b --2/1991--.

Signed and Sealed this

Twenty-third Day of December, 1997

Attest:

BRUCE LEHMAN

*Attesting Officer*    *Commissioner of Patents and Trademarks*